(12) United States Patent
Kump et al.

(10) Patent No.: US 6,428,927 B2
(45) Date of Patent: *Aug. 6, 2002

(54) DETACHABLE ROPE HANDLE ASSEMBLY FOR A BATTERY

(75) Inventors: William H. Kump, St. Paul; Steven R. Peterson, Minneapolis, both of MN (US)

(73) Assignee: GNB Technologies, Inc., Lombard, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,118

(22) Filed: Dec. 2, 1999

(51) Int. Cl.⁷ .................................. H01M 2/10
(52) U.S. Cl. ........................ 429/187; 29/623.1
(58) Field of Search ............... 429/187; 29/623.1

(56) References Cited

U.S. PATENT DOCUMENTS

| | | |
|---|---|---|
| 971,876 A | 10/1910 | Apple |
| 1,567,799 A | 12/1925 | Galloway |
| 1,938,158 A | 12/1933 | Steele |
| 2,277,976 A | 3/1942 | Helmenstine |
| 3,092,520 A | 6/1963 | Buskirk et al. |
| 3,093,515 A | 6/1963 | Rector |
| 3,770,511 A | 11/1973 | Winterbottom et al. |
| 3,797,876 A | 3/1974 | Gummelt |
| 3,845,542 A | 11/1974 | Sabatino |
| 3,956,022 A | 5/1976 | Fox |
| 4,013,819 A | 3/1977 | Grabb |
| 4,029,248 A | 6/1977 | Lee |
| D266,757 S | 11/1982 | Campbell et al. |
| 4,374,188 A | 2/1983 | Campbell et al. |
| 4,673,625 A | 6/1987 | McCartney et al. |
| D292,696 S | 11/1987 | Sahli |
| 4,791,702 A | 12/1988 | McVey |
| 5,144,719 A | 9/1992 | Arthur |
| 5,232,796 A | 8/1993 | Baumgartner |
| 5,242,769 A | 9/1993 | Cole et al. |
| 5,283,137 A | 2/1994 | Ching |
| 5,415,956 A | 5/1995 | Ching |
| 5,440,785 A | 8/1995 | McDonald |
| 5,624,772 A | 4/1997 | McVey et al. |
| 5,637,420 A | 6/1997 | Jones, Jr. et al. |
| 5,670,274 A | 9/1997 | Forrer |
| 6,177,211 B1 * | 1/2001 | Lawrence .............. 429/187 |

FOREIGN PATENT DOCUMENTS

| | | |
|---|---|---|
| DE | 88 05 405 U1 | 7/1988 |
| EP | 0 355 854 A1 | 2/1990 |
| GB | 869329 | 5/1961 |
| GB | 1 453 977 | 10/1976 |
| GB | 2 303 295 A | 2/1997 |

* cited by examiner

Primary Examiner—Gabrielle Brouillette
Assistant Examiner—Mark Ruthkosky
(74) Attorney, Agent, or Firm—Morrison & Foerster LLP

(57) ABSTRACT

A battery including a rope handle which engages a handle bracket on a conventional battery container. The rope handle includes a grip and a rope, the proximal end of the rope being molded into, or otherwise secured to, the grip and a cylindrical plug molded on the distal end of the rope. The grip includes a retaining recess comprising a counterbore presenting a bearing surface, and lateral slot between the upper and lower surfaces of the grip and extending radially from the counterbore to present a substantially keyhole-shaped opening. In assembly, the distal end of the rope is advanced laterally through the slot portion of the keyhole-shaped opening until the counterbore is positioned subjacent the plug. The plug is then moved downward into the counterbore. To hide the rope ends in the preferred embodiment, a cover can be snapped in place over the top of the grip.

24 Claims, 7 Drawing Sheets

DETACHABLE ROPE HANDLE ASSEMBLY FOR A BATTERY

FIELD OF THE INVENTION

The invention relates to handles for carrying batteries, and more particularly to a rope-type battery carrying handle that has an end of the rope removably attached to an end of a grip.

BACKGROUND OF THE INVENTION

Starting, lighting, and ignition (SLI) batteries are typically used in automotive, recreational, and other applications, are heavy, cumbersome, and usually require two hands, or often two people, for carrying. The desirability of providing such batteries with attachable/detachable handles for facilitating carrying, placement, and retrieval of such batteries has long been known. Such handles are a particular convenience in batteries designed for use in boats or in uninterrupted power supply (UPS) applications which must be frequently moved for storage, service, or recharging.

Bail-type handles, which are known in the art, typically comprise a U-shaped or C-shaped member attached to opposing sides of a battery casing, either on its container or cover. With such handles, the battery may be carried in much the same fashion as a picnic basket or bail.

Substantially rigid bail-type handles are known in the art. A variety of such handle designs have been proposed for carrying batteries. Detachable, substantially rigid bail handles are disclosed, for example, in U.S. Pat. No. 3,093,515 to Rector, U.S. Pat. No. 3,956,022 to Fox, U.S. Pat. No. 4,029,248 to Lee, U.S. Patent No. 4,673,625 to McCartney et al., U.S. Patent No. 5,232,796 to Baumgartner, U.S. Pat. No. 5,242,769 to Cole et al., and U.S. Pat. Des. No. 292,696 to Sahli.

Rope-type handles are likewise known in the art. Rope-type handles typically have one or more injection molded plastic part coupled by flexible rope sections and, accordingly, are physically highly flexible. The rope sections are generally a braided synthetic material such as polypropylene.

According to one type of rope handle design, the ends of the rope handle are manually fed into two holes and coupled to the battery container. In the battery disclosed in U.S. Pat. No. 3,092,520 to Buskirk et al., the rope handle is coupled to the battery container by cementing the ends of the rope in recesses in projections on the sides of the battery container. Alternately, the ends of the rope handle may include an enlarged molded plastic portion and may be pressed into slots underneath the handle bracket area as shown, for example, in U.S. Pat. No. 3,797,876 to Gummelt and U.S. Pat. No. 4,013,819 to Grabb. According to other designs, the ends of the rope may be enlarged as shown for example in British Patent 869,329, or the ends coupled or welded together as shown for example in British Patent 869,329 and British Patent 1,453,977.

In another type of rope handle design, looped rope portions extend from the ends of a molded plastic grip portion as shown, for example, in U.S. Pat. No. 971,876 to Apple, U.S. Pat. No. 4,791,702 to McVey, and U.S. Pat. No. 5,242,769 to Cole et al. The looped rope portions are then coupled to the battery container via dedicated protrusions extending from the walls of the battery by looping the rope around the protrusion and then securing it into a recess or the like.

Another such rope handle design is disclosed in U.S. Pat. No. 5,144,719 to Arthur. The Arthur patent discloses a "U-shaped" handle having one end of the rope embedded in one depending leg of the handle. The opposite end of the rope includes an enlarged head, which may be fed through lugs on the battery. The enlarged head and the adjacent length of rope are then laid into a tri-part vertical slot on the other depending leg of the handle, the head being disposed in the upper portion of the slot, the adjacent rope extending through the lower two portions of the slot. Significantly, however, the head and adjacent rope section are not secured to the handle. As may be seen in the illustrations of the reference, there is sufficient clearance between the head and the slot, as well as the adjacent rope section and the slot such that the head and rope section may become easily dislodged from the handle leg unless a constant vertical force is maintained on the handle. Accordingly, the Arthur handle does not provide an attachment mechanism which is reliable. Moreover, the intricate coupling design requires the user to have a high level of manual dexterity and a working knowledge of the defailed structure of the complex attachment.

Installation of these rope handle designs may be labor intensive. Properly securing the ends of the rope to the battery container or securing the loop ends around a protrusion and into a recess can be quite time consuming and may require manual dexterity. These difficulties in installing the battery handles can lead to improper installation, which can result in an unreliable battery handle.

Additionally, these designs generally require specialized handle brackets to be molded into specific containers. Complicated grip and/or rope end configurations may also be required. These requirements can result in increased costs in the form of mold and tooling costs, as well as increased labor and downtime costs during changeover. Further, storage and floor space costs increase because the battery manufacturer must maintain larger inventories.

OBJECTS OF THE INVENTION

It is a primary object of the invention to provide a rope handle that may be reliably and easily assembled onto a battery container and which remains securely coupled to the battery until purposely removed by the user.

A related object of the invention is to provide a rope handle arrangement that has a relatively simple design, and does not require high manual dexterity to assembly for a secure, reliable handle.

It is a further object of the invention to provide a rope handle that may be utilized with a battery that produces an acceptable appearance.

It is another object of the invention to provide a rope handle that contributes to the production of an economical battery. A related object of the invention is to provide a rope handle design that minimizes manufacturing and inventory costs.

These and other objects and advantages of the invention will be apparent to those skilled in the art upon reading the following summary and detailed description and upon reference to the drawings.

SUMMARY OF THE INVENTION

In accomplishing these and other objects of the invention, there is provided a battery that includes rope handles each of which engages a handle bracket on an end wall of a conventional battery container. Each rope handle includes a grip with a retaining recess at one end of the grip and a rope secured to the other end of the grip by molding or the like.

The rope has an enlarged distal end or a cylindrical plug molded for engaging the retaining recess of the grip. The retaining recess includes a generally keyhole-shaped slot which extends through the grip from a first surface to a second surface and which has a hole portion and a channel portion projecting radially from the hole portion and terminating at an end. The retaining recess also includes a counterbore located on the first surface of the grip and encompassing the hole portion of the slot. To secure the rope to the grip, the rope is slid through the slot and the plug is subsequently drawn towards the grip and is retained within the counterbore, thus securing the handle to the battery container. In other words, the retaining recess includes a counterbore with a subjacent retaining surface for receiving and supporting the plug, and radially extending slot. The rope is laterally advanced through the slot to move the plug into position above the counterbore. The plug is then pushed down into position in the counterbore and/or a downward force is exerted on the rope to position the plug and secure the rope handle.

DETAILED DESCRIPTION OF THE INVENTION

Figure 2:
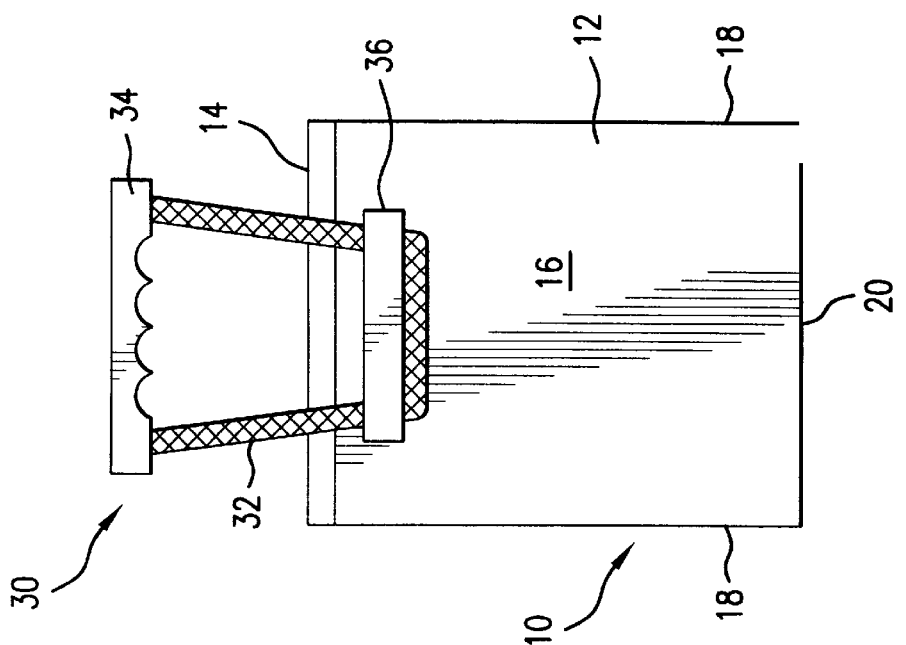
FIG. 2 is an end elevational view of the battery and rope handle of FIG. 1.
Figure 1:
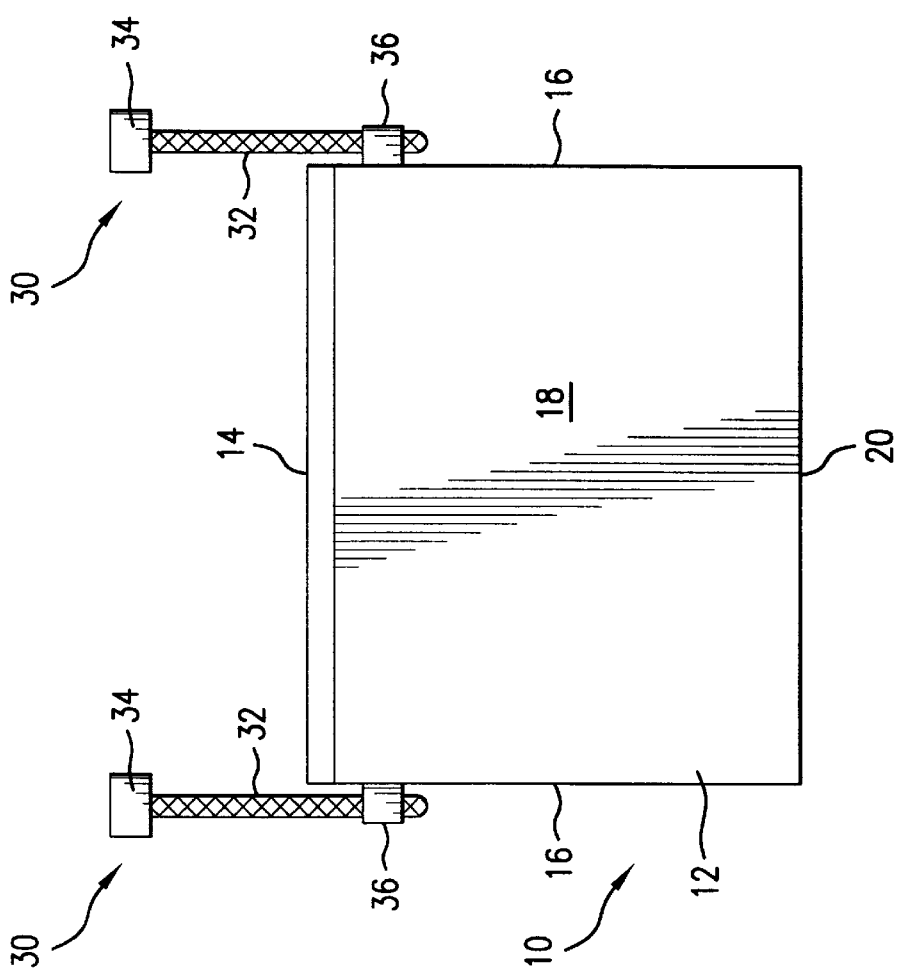
FIG. 1 is a side elevational view of a battery comprising a rope handle constructed in accordance with teachings of the invention.

Turning now to the drawings, there is shown in FIGS. 1 and 2, a battery 10 having a container 12 and a lid 14. The container 12 includes end walls 16, side walls 18, and a bottom 20 and houses the internal components (not shown) of the battery 10. In accordance with the invention, the battery further includes a pair of detachable rope-type handles 30 that include a flexible rope 32 secured to a grip 34. Referring to FIG. 2, the handle 30 is removably attached to the battery 10 through a handle bracket 36 projecting out from the end wall 16.

Figure 3:
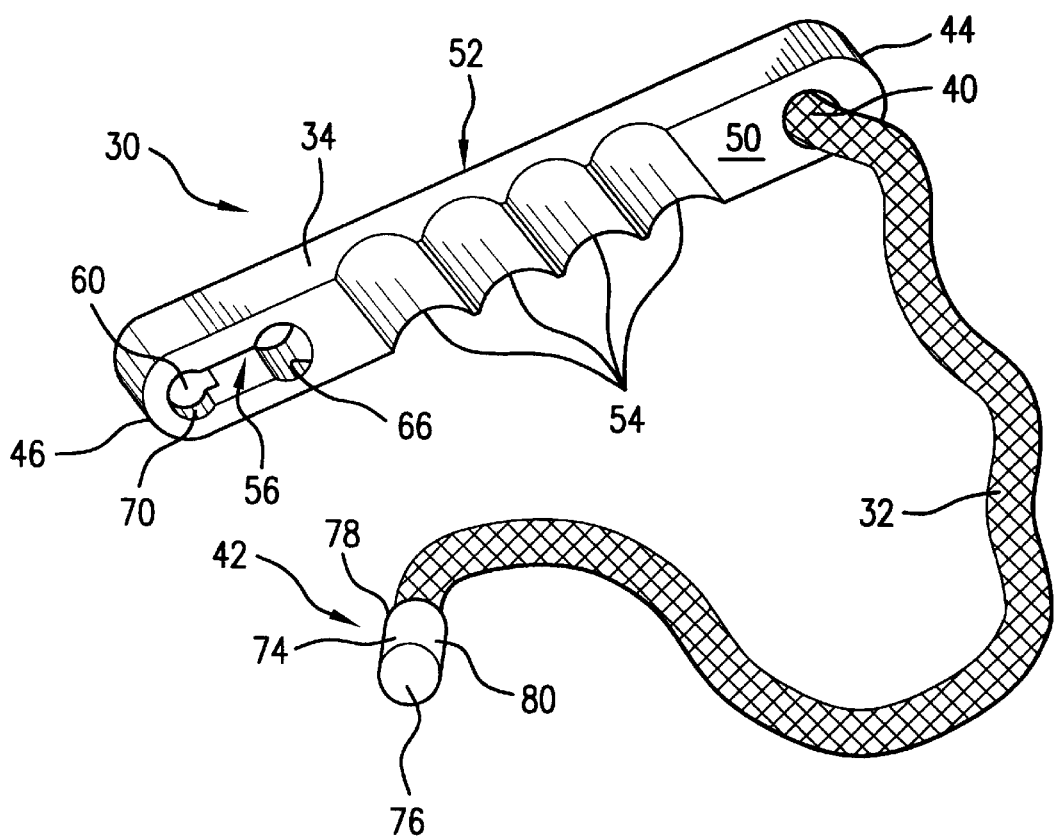
FIG. 3 is a perspective view of the rope handle of FIG. 1.

Referring to FIG. 3, the handle 30 is shown detached from the battery 10. The rope 32 is preferably a synthetic material, such as polypropylene, but can be any other material which exhibits the required flexibility and tensile strength for any given application. The rope 32 is preferably composed of braided strands. The rope 32 includes a proximal end portion 40 and a distal end portion 42, which secure the rope 32 to the grip 34.

In the currently preferred embodiment of the invention, as illustrated in FIGS. 3–7, the proximal end portion 40 is molded into the grip 34 by any suitable method as is known in the art. The proximal end portion 40 may alternately be secured to the grip 34 by other permanent means such as, for example, by inserting the rope 32 into a hole in the grip 34 near one end 44 and tying a knot in the rope 32 at or near the end portion 40 or by cementing, epoxying, or otherwise gluing the end portion 40 to the grip 34. Alternatively, the proximal end portion 40 can be configured so that it is secured to the grip 34 by detachable means such as, for example, in a manner as will be described herein with respect to the distal end portion 42. Moreover, it will be appreciated by those skilled in the art that the rope 32 of each grip 34 may include multiple rope pieces disposed in parallel arrangement for added strength.

The grip 34 is substantially rigid and is preferably molded of a polymeric material such as polypropylene. The grip 34 includes preferably rounded ends 44, 46. The proximal and distal end portions 40, 42 of the rope 32 are secured to the grip 34 proximally to the ends 44, 46, respectively. The grip 34 includes a lower grip surface 50 and an upper retainer surface 52, the grip surface 50 preferably including a series of indentations 54 for receiving the user's fingers to provide carrying comfort.

In accordance with the invention, the distal end portion 42 of the rope 32 is removably coupled to an end 46 of the grip 34 by means of a particularized retaining recess 56 proximal to the end 46 of the grip 34 which cradles a complementary structure at the distal end 42 of the rope 32. Once the mating is achieved, the rope end 42 remains coupled to the grip 34 despite varying levels or complete release of tension on the handle 30.

Figure 4:
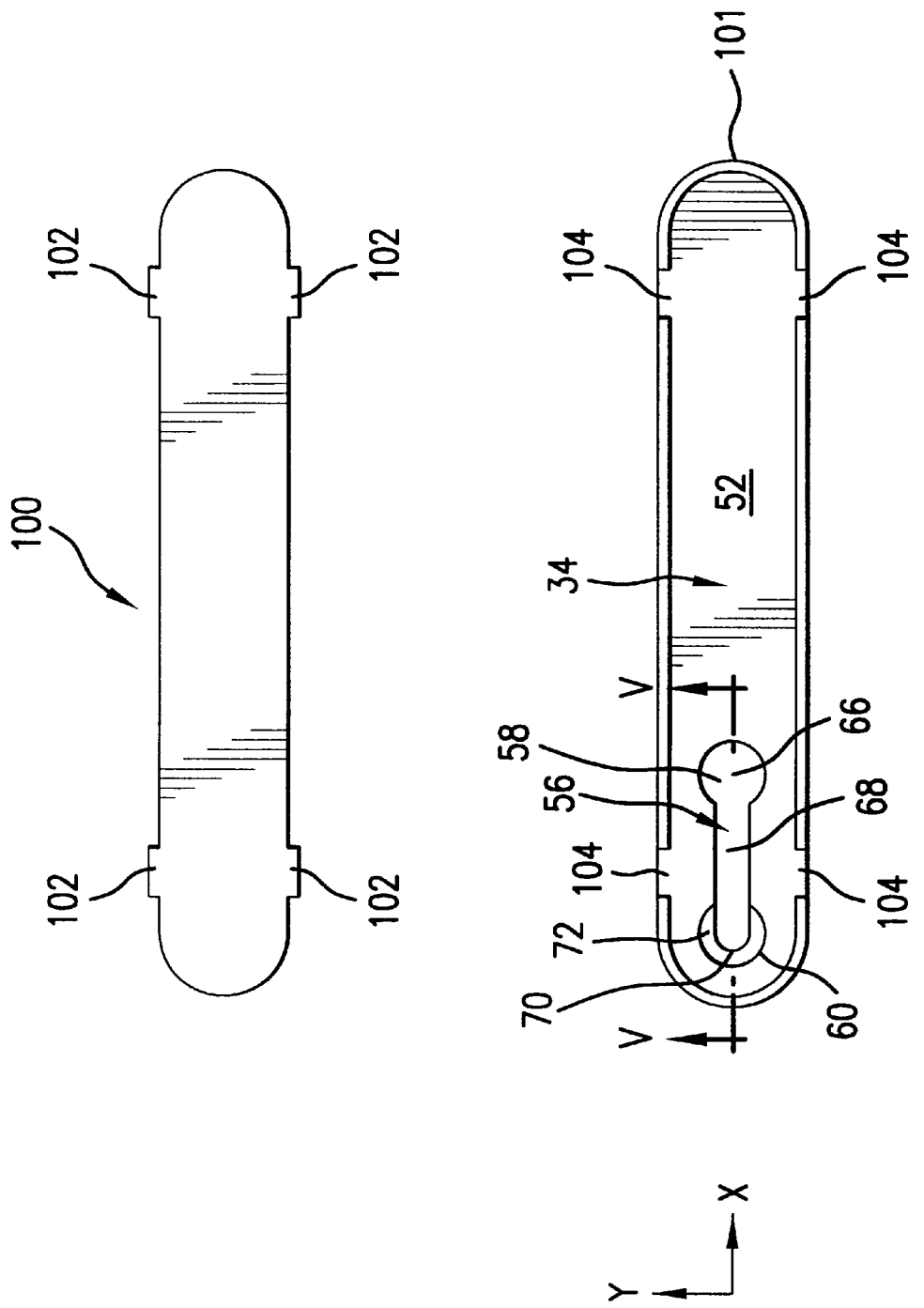
FIG. 4 is a top plan view of the components of a grip of the rope handle of FIG. 1.
Figure 5:
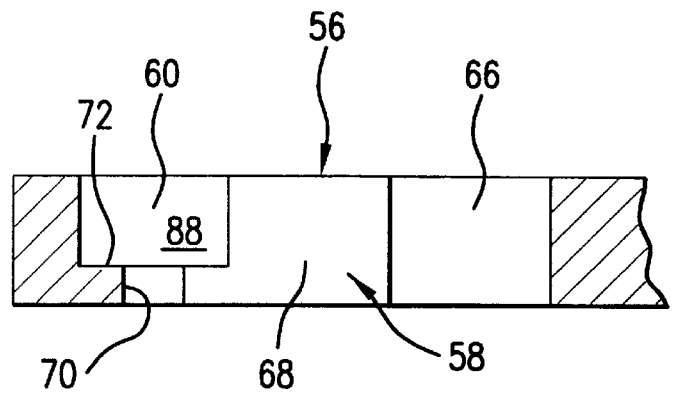
FIG. 5 is an enlarged fragmentary side view in section of the grip taken along line V—V in FIG. 4.

As may be seen in FIGS. 3–5, the distal end portion 42 of the rope 32 comprises an enlarged, preferably molded, plug portion 74. The plug portion 74 may alternately be an enlarging, or "buttoning" of the end of the rope 32, or the plug may be otherwise secured to the distal end 42 of the rope 32. The retaining recess 56 comprises a counterbore 60 with a retaining surface 72 subjacent the counterbore 60, and a lateral slot 58 extending substantially radially from the axis of the counterbore 60. During assembly, the plug portion 74 is disposed above the upper surface of the grip 34 as the rope 32 is moved longitudinally through the slot 58 to position the plug portion 74 above the counterbore 60. Significantly, the plug portion 74 is of a complementary shape such that, during assembly, the plug portion 74 may then be lowered into the counterbore 60 with the rope 32 extending through the slot 68. Thus, the plug portion 74 is received in the counterbore 60 and seated against the retaining surface 72 during use to retain the handle in the assembled position. Significantly, in assembling the handle 30, the plug portion 74 need only be moved into position adjacent the counterbore 60 and a downward force exerted on the rope 32 to drop the plug portion 74 into position. No further manipulation or coupling of the rope itself, such as is required by the Arthur '719 patent is necessary. Moreover, once in position, the handle 30 is securely assembled to the battery 10, an cannot generally be accidentally disassembled.

In order to position the rope 32 to be laterally advanced through the slot 58, the grip 34 further includes a rope access opening. In the first embodiment of the invention illustrated, the rope access opening is in the form of a bore or hole 66 extending through the grip and cooperatively associated with the slot 58. Thus, as may best be seen in FIG. 4, the retaining recess 56 includes a generally keyhole-shaped through opening 58 cooperatively associated with the counterbore 60. The keyhole opening 58 extends through the grip 34 and includes a circular bore 66 opening into the slot 68 projecting radially from the counterbore 60. During assembly, the user passes the plug portion 74 upward through the bore 66 to position the rope 32 to be advanced through the slot 68.

As also illustrated in FIG. 4, the end 70 of the slot 68 subjacent the counterbore 60 is substantially semi-circular. The counterbore 60 is disposed concentrically about the end 70 and a portion of the elongated slot 68. The counterbore 60 is preferably substantially circular in this embodiment, and is oriented such that the center of the counterbore 60 is aligned with the radial center of the end 70. It will be appreciated that the transition between the counterbore 60 and the end of the slot 68 forms the bearing surface 72 against which the plug 74 bears once the handle 30 is assembled.

Figure 6:
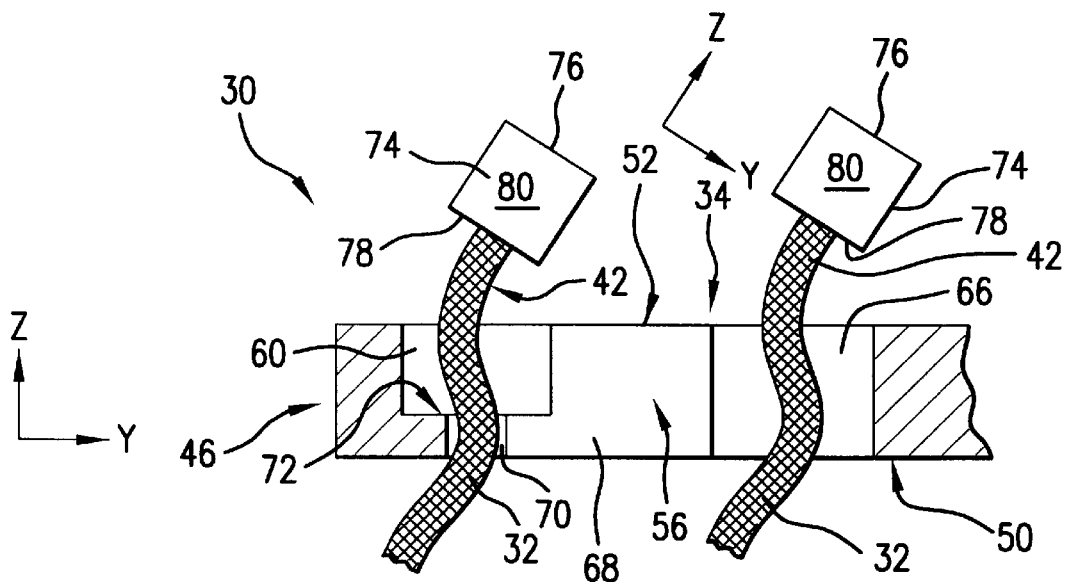
FIG. 6 is a cross-sectional view of the grip as in FIG. 5 and a side view of the rope that shows the rope in various positions within the grip, as it would be located upon being removably.

Referring again to FIG. 3, the plug 74 at the distal end portion 42 of the rope 32 is preferably made of a strong and resilient polymeric material, such as polypropylene. In the illustrated embodiment, the plug 74 is cylindrical with an upper end 76, a lower end 78 and a wall surface 80. The height of the wall surface 80 is measured along the z-axis of the plug 74, as shown in FIG. 6. The plug 74 could be any desired shape provided that it may be received within the counterbore 60, and the lower end 76 substantially conforms to the bearing surface 72.

As shown in FIGS. 4 and 5, the shape of the hole 66 is configured to freely receive the plug 74. In this embodiment, the shape of both the upper and lower ends 76, 78 of the plug 74 must be such that they allow the plug 74 to pass through the hole 66. Preferably, the shape of the hole 66 is slightly larger than the diameter of the upper and lower ends 76, 78 of the plug 74. During assembly the plug 74 is advanced upward through hole 66 in the handle 34. The plug 74 and the distal end 42 of the rope 32 are then moved longitudinally, or along the x-axis of the slot 68 to align the plug 74 and rope 32 with the counterbore 60 and circular end 70 of the slot, respectively.

It will thus be appreciated that the width of the slot 68 as measured along a y-axis (see FIG. 4) must be sufficient to allow the rope 32 to pass between the hole 66 and the circular end 70 of the slot 68, along an x-axis, or longitudinal axis of the slot 68. In order to facilitate maintaining the handle in an assembled position, however, the width of the slot 68 is not sufficiently wide to allow the free passage of the plug 74. In this way, once-the plug 74 is disposed in the region of the counterbore, the plug 74 cannot readily become disassembled. It will be appreciated that the width of the slot 68 may be less than the diameter of the rope 32 such that the user must apply a lateral force to the rope 32 or twist and stretch the rope 32 to move it laterally along the slot 68. Preferably, however, the radius of the end 70 of the slot 68 substantially confirms to the cross-sectional radius of the rope 32 so that the rope 32 is in an unstressed state when the handle 30 is locked in position.

In order to "lock" the plug 74 to the grip 34 to form the assembled handle 30, the counterbore 60 is configured to accept the plug 74. In the illustrated embodiment, both the plug 74 and the bore 60 are circular such that the diameter of the counterbore 60 is configured to confirm with the diameter of the upper and lower ends 76, 78 of the plug 74, the plug 74 and the counterbore 60 being circumjacent with the lower surface 78 of the plug 74 seating on the bearing surface 72 when assembled. It will be appreciated, however, that the plug and counterbore may have alternate geometric shapes, so long as the plug may be securely seated in the bore to effectively lock the plug to the grip. The depth of the counterbore 70 and the height of the wall surface 80 of the plug 74 are preferably configured to conform such that the upper end 76 of the plug 74 is substantially flush with the retainer surface 52 of the grip 32 when the lower end 78 of the plug 74 is seated on the bearing surface 72. As with the geometric shape of the plug, however, the surface 80 may be greater or less than the depth of the counterbore 60.

Figure 7:
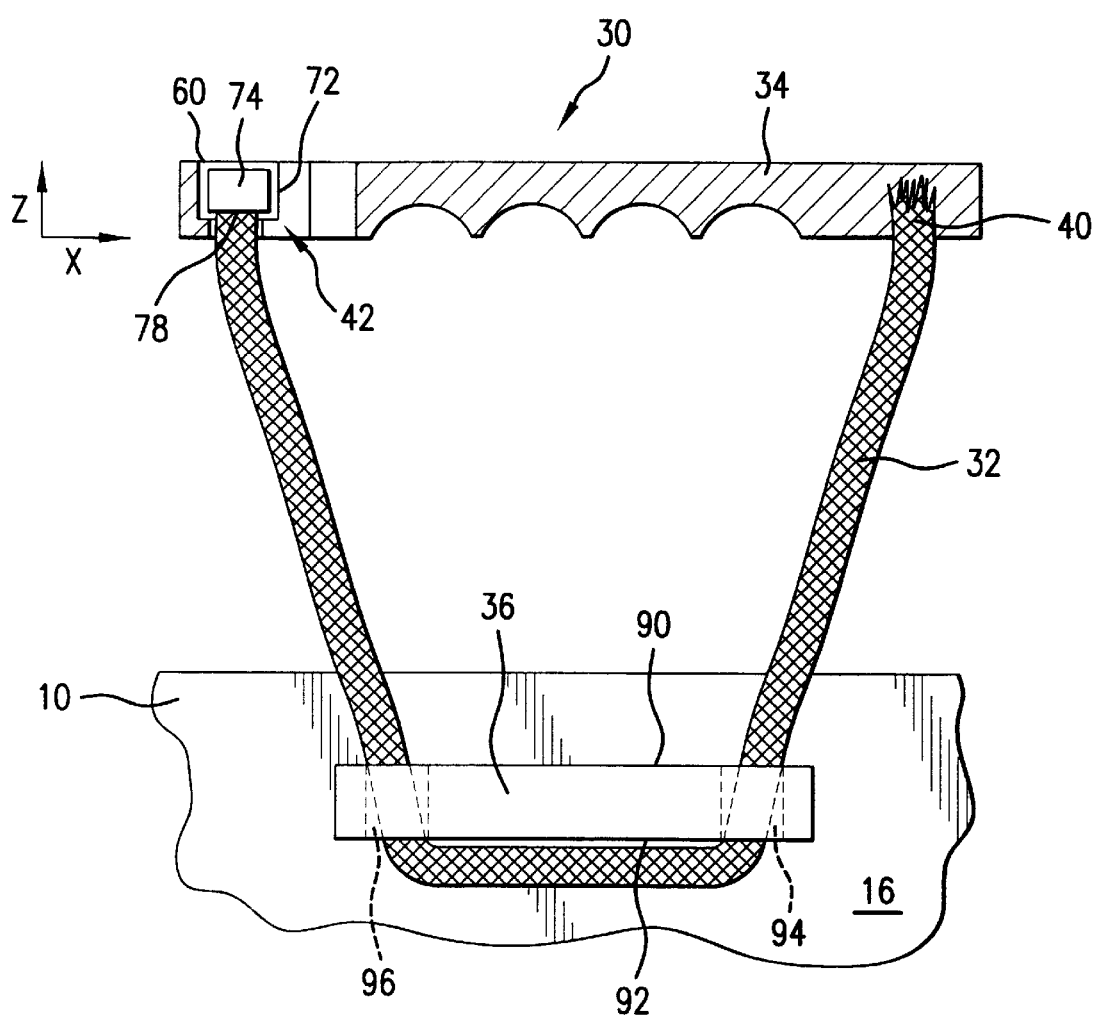
FIG. 7 is a partial sectional view of the rope handle of FIG. 1 that shows a plug and rope removably attached to the grip.

FIGS. 6 and 7 sequentially illustrate the assembly of the rope handle 30 by removably attaching the distal end portion 42 of the rope 32 into the grip 34. Specifically, the plug 74 is cooperatively positioned with the retaining recess 56 and is passed upward though the hole 66 from the grip surface 50 to the retainer surface 52. Once the plug 74 has moved out from the plane of the retainer surface 52, the distal end portion 42 is moved towards the end 46 of the grip 34 along the longitudinal axis of the slot 68. The width of the slot 68 is preferably slightly less than the diameter of the braided rope 32. Consequently, to move the rope 32 through the slot 68, the user radially twists the rope 32 thereby flattening the rope 32 and reducing its width. To secure the distal end portion 42 into the grip 34, the plug 74 is inserted into the counterbore 60. The lower end 76 of the plug 74 is seated on the bearing surface 72 to allow the user to hold the rope handle 30 by the grip 34 to carry a load. Because the rope 32 must be twisted to pass through the slot 68, the configuration of the slot 68 and the rope 32 help maintain the plug 74 in the counterbore 60 and prevent inadvertent disassembly of the handle 30. To disassemble the rope handle 30, the previous steps are performed in reverse order.

Referring to FIG. 7, to use the handle 30 with a battery 10, the plug 74 is removably attached to the battery 10 through a handle bracket 36 projecting out from the end wall 16. The bracket 36 has a top surface 90 and a bearing surface 92 and a pair of holes 94, 96, the holes 94, 96 running through from top surface 90 to the bearing surface 92. The shape of the holes 94, 96 must be large enough to allow passage of the plug 74, and preferably conforms to the shape of the plug 74. To removably attach the handle 30 to the bracket 36, the plug 74 is threaded from the top surface 90 through the hole 94 to the bearing surface 92. The plug 74 is threaded subsequently from the bearing surface 92 through the hole 96 to the top surface 90. The plug 74 is then removably attached to the retaining recess 56 of the grip 34 as described above.

To produce a finished appearance, a cover 100, such as is illustrated in FIG. 4, can optionally be placed over the retainer surface 52 of the grip 34. The cover 100 conforms to the size and shape of the retainer surface 52 to cover the surface and to hide the retaining recess 56. To secure the cover 100 to the grip 34 in the illustrated embodiment, a rib 101 is provided about the periphery of the retainer surface 52 of the grip 34, and the cover 100 includes tabs 102 which can be inserted into corresponding slots 104 formed as interruptions in the rib 101 extending about the periphery of the grip 34. The tabs 102 removably attach the cover 100 to the grip 34 by creating an interference fit. It will be appreciated that the cover 100 may be alternately coupled. For example, the cover may be unitarily molded with the handle, the cover being coupled by the handle by a living hinge or the like (not illustrated).

Figure 8:
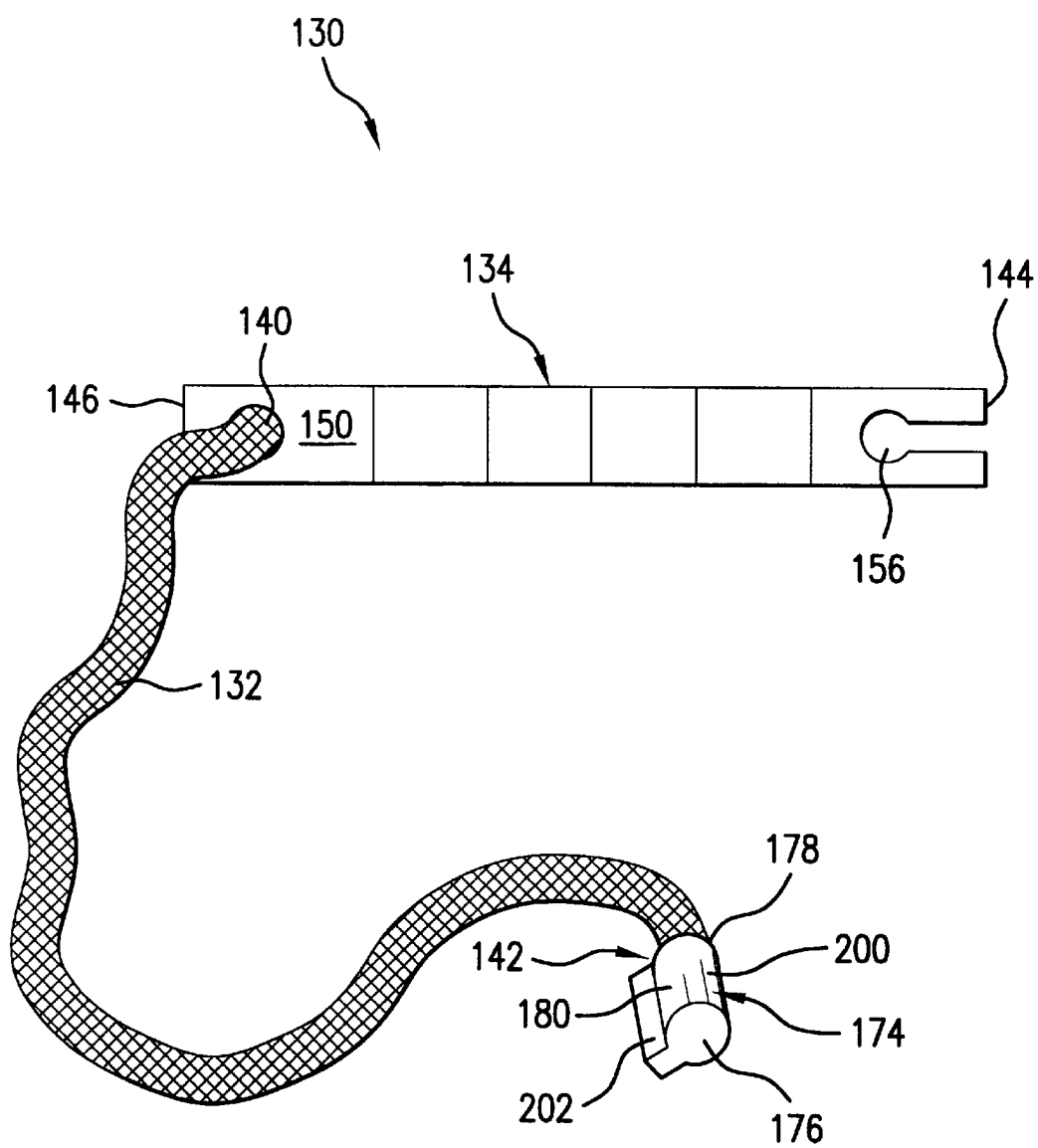
FIG. 8 is a perspective view of a second embodiment of a rope handle constructed in accordance with the teachings of the invention.

FIG. 8 illustrates a second embodiment of a rope handle in accordance with the invention. (Note that components in this embodiment which are similar to those in the first embodiment are designated by like numbers with a "1" prefix, i.e., "1xx.") A rope handle 130 is shown that includes a rope 132 with a plug 174 and a grip 134. The grip has ends 144, 146 and includes a retaining recess 156 with counterbore 160 located contiguous with the end 144. In this embodiment, the plug portion 174 is not passed upward through the grip 134, and the rope 132 then moved laterally within the grip 134 to be positioned within the counterbore 160. Rather, the rope 132 is advanced laterally in the retaining recess 156 from an outside surface of the grip 134 to move the plug 174 into an appropriate position to be locked to the grip 134.

Figure 9:
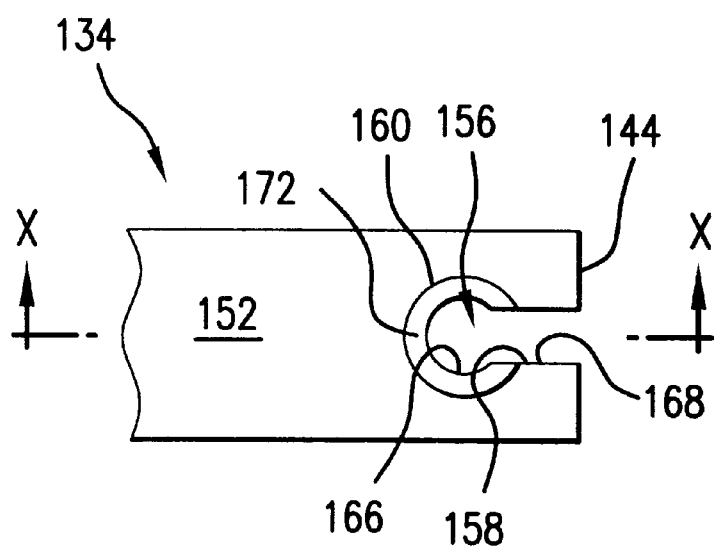
FIG. 9 is a fragmentary, top plan view of the embodiment of the rope handle shown in FIG. 8.

In this embodiment, the retaining recess 156 and the plug 174 have alternate geometric shapes. Referring to FIG. 9, the retaining recess 156 includes a keyhole-shaped through slot 168 cooperatively associated with a counterbore 160. The keyhole-shaped slot 168 extends through the grip 134 and includes a circular hole 166 opening into a channel 158, the slot 168 projecting radially from the counterbore 160. Significantly, in this embodiment, the slot 168 extends from the counterbore 160 and terminates at the end 144 of the grip 134, rather than at an opening extending through the grip for passage of the plug, as in the first embodiment. Thus, in coupling the distal end 142 of the rope 132 to the grip 134, the rope 132 is advanced into the retaining recess 156 from the edge of the grip 134, eliminating the step of threading or feeding the plug portion up through the grip 134. As with the first embodiment, the width of the slot 168 is sufficiently wide to allow the rope 132 to slide along the longitudinal axis of the slot 168 and into hole 166, either by applying a radial force the rope 132, or by twisting the rope 132 and then applying a radial force.

As with the first embodiment, the counterbore 160 encompasses the hole. 166 and a portion of the channel 158. The counterbore 160 is shaped to receive the plug 200. In this case, the counterbore 160 is circular and is oriented such that the center of the counterbore 160 is aligned with the center of the hole 166. The counterbore 160 presents a bearing surface 172.

As shown in FIG. 8, the proximal and distal end portions 140, 142 secure the rope 32 to the grip 34. The proximal end portion 140 is permanently attached to the grip 134, and the distal end portion 142 can be removably attached to the grip 14. The distal end portion 142 of the rope 132 in FIG. 8 is shown as a key 174. The key 174 includes a plug portion 200 and a rib portion 202. The plug 200 is cylindrical. The rib 202 is a rectangular block that projects radially from the plug 200. The key 174 includes an upper end 176, a lower end 178 and a wall surface 180. The ends 176, 178 are shaped to correspond with the counterbore 160 and the channel 158. The wall surface 180 defines the height of the key 174 and spans between the upper and lower ends 176, 178.

Figure 10:
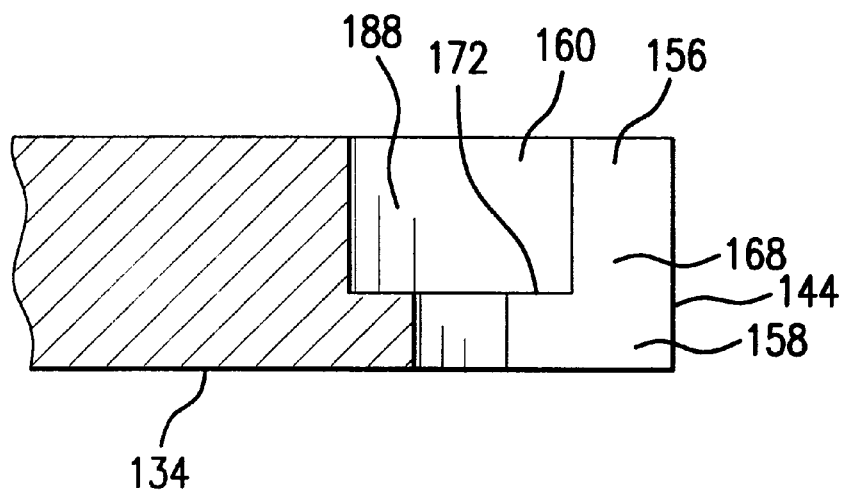
FIG. 10 is an enlarged fragmentary side view in section of the grip taken along line X—X in FIG. 9.

Referring to FIGS. 9 and 10, the width of the slot 168 is configured in conformance with the diameter of the rope 132 and the width of the rib 202 such that the rope 132 is capable of sliding along the longitudinal axis of the slot 168 and passing through the slot 168, but the key 174 cannot enter or pass through the slot 168. In this way, the rib 202 substantially fills the slot 168 when the plug portion 200 of the key 174 is seated on the bearing surface 172. The counterbore 160 is configured to accept the plug portion 200 of the key 174. The diameter of the counterbore 160 is configured to conform with the diameter of the plug portion 200 such that the plug portion 200 and the counterbore 160 are circumjacent when assembled. The depth of the counterbore 160 is preferably configured to conform with the height of the wall surface 180 of the plug portion 200 such that the upper end 176 of the key 174 is substantially flush with a retainer surface 152 of the grip 134 when the lower end 178 of the key 174 is seated on the bearing surface 172.

In summary, the present invention thus provides a battery handle assembly having a plastic grip and rope assembly with an interlocking feature which provides a reliable handle assembly that is unlikely to be inadvertently disassembled during normal use. The grip includes a counterbore which presents a lower bearing surface against which the lower surface of a plug at a distal, free end of the rope bears once assembled. The grip further includes a channel opening which extends radially from the counterbore, the channel opening extending through the grip. During assembly, the slot is sufficiently wide to allow passage of the rope, but not of the plug. The rope is advanced laterally through the slot, the plug being disposed above the upper surface of the grip. The rope is then moved axially downward and the plug moved into the counterbore until such time as the plug abuts the bearing surface within the counterbore. Thus, the battery handle is reliably and easily assembled onto and disassembled from a battery container. Moreover, the invention presents a handle which may be economically manufactured by an automated process.

While this invention has been described with an emphasis upon preferred embodiments, it will be obvious to those of ordinary skill in the art that variations of the preferred embodiments may likewise be encompassed by the invention and that it is intended that the invention may be practiced otherwise than as specifically described herein. Accordingly, this invention includes all modifications encompassed within the spirit and the scope of the invention.

We claim:

1. An electric storage battery comprising:
   a battery container having a wall and a handle bracket projecting outward from the wall, the bracket defining at least one aperture there through,
   a handle removably coupled to the bracket, the handle comprising
   a molded polymeric grip, said grip comprising an upper surface, a lower surface, a first end, and a second end, and defining a retaining recess proximal to the second end, said retaining recess comprising a counterbore having a substantially vertical axis and opening along the upper surface, a retaining surface subjacent the counterbore, a rope access opening, and a slot extending between the upper and lower surfaces of the grip, said slot having first and second ends and extending substantially radially from said counterbore vertical axis, said slot first end opening into said rope access opening and said slot second end opening into said counterbore,
   a rope having a proximal end, a medial body, and a distal end, the proximal end of the rope being molded into the grip proximal to the first end such that the proximal end of the rope is secured to and integral with the first end of the molded grip, the medial body extending through the at least one container aperture to couple the handle to the container, the rope being sized to be moveable within the rope access opening, the slot, and the counterbore,
   an enlarged plug secured to the distal end of the rope, the plug defining a bearing surface disposed adjacent the rope, the plug being sized to be received in the counterbore,
   such that during assembly, the plug may be disposed along the upper surface of the grip and the distal end of the rope may be advanced through the rope access opening and longitudinally through the slot from the rope access opening to the counterbore to position the plug above the counterbore with the rope extending through the second end of the slot, and such that a downward force may then be applied to the plug along the vertical axis of the counterbore to dispose the plug within the counterbore to couple the distal end of the rope to the grip.

2. The battery as claimed in claim 1 wherein the counterbore has a substantially round cross-section, and the plug has a substantially round cross-section.

3. The battery as claimed in claim 1 wherein the second end of the slot is disposed subjacent the counterbore and the retaining surface.

4. The battery as claimed in claim 1 wherein the plug has a top surface, the top surface of the plug being flush with the upper surface of the grip when the plug is disposed within the counterbore.

5. An electric storage battery comprising:
  a battery container having a wall and a handle bracket projecting outward from the wall, the bracket defining at least one aperture there through,
  a handle removably coupled to the bracket, the handle comprising
    a grip, said grip comprising an upper surface, a lower surface, a first end, and a second end, and defining a retaining recess proximal to the second end, said retaining recess comprising a counterbore having a substantially vertical axis and opening along the upper surface, a retaining surface subjacent the counterbore, a rope access opening, and a slot extending between the upper and lower surfaces of the grip, said slot having first and second ends and extending substantially radially from said counterbore vertical axis, said slot first end opening into said rope access opening and said slot second end opening into said counterbore,
    a rope having a proximal end, a medial body, and a distal end, the proximal end of the rope portion being coupled to the grip proximal to the first end, the medial body extending through the at least one container aperture to couple the handle to the container, the rope having a rest cross-section when no external forces are applied to the rope, and a relatively smaller twist cross-section when the rope is twisted, the slot and rope being relatively sized such that the twist cross-section of the rope may freely pass through the slot, but the rest cross-section of the rope cannot pass freely through the slot,
    an enlarged plug secured to the distal end of the rope, the plug defining a bearing surface disposed adjacent the rope, the plug being sized to be received in the counterbore,
    such that during assembly, the plug may be disposed along the upper surface of the grip and the distal end of the rope may be advanced through the rope access opening and longitudinally through the slot from the rope access opening to the counterbore to position the plug above the counterbore with the rope extending through the second end of the slot, and such that a downward force may then be applied to the plug along the vertical axis of the counterbore to dispose the plug within the counterbore to couple the distal end of the rope to the grip.

6. The battery as claimed in claim 5 wherein the counterbore has a substantially round cross-section, and the plug has a substantially round cross-section.

7. The battery as claimed in claim 5 wherein further comprising a rib extending radially from the plug, the rib being configured to be received in the slot when the plug is disposed in the counterbore.

8. The battery as claimed in claim 5 wherein the second end of the slot is disposed subjacent the counterbore and the retaining surface.

9. The battery as claimed in claim 5 wherein the plug has a top surface, the top surface of the plug being flush with the upper surface of the grip when the plug is disposed within the counterbore.

10. The battery as claimed in claim 5 wherein the handle further comprises a cover cooperatively associated with the upper surface of the grip when the plug is disposed within the counterbore.

11. The battery as claimed in claim 5 wherein the rope has a rest cross-section when no external forces are applied to the rope, and a relatively smaller twist cross-section when the rope is twisted, the slot and rope being relatively sized such that the rope the twist cross-section of the rope may freely pass through the slot, but the rest cross-section of the rope cannot pass through the slot.

12. An electric storage battery comprising:
  a battery container having a wall and a handle bracket projecting outward from the wall, the bracket defining at least one aperture there through,
  a handle removably coupled to the bracket, the handle comprising
    a grip, said grip comprising an upper surface, a lower surface, a first end, a second end, and at least one sidewall, and defining a retaining recess proximal to the second end, said retaining recess comprising a counterbore having a substantially vertical axis and opening along the upper surface, a retaining surface subjacent the counterbore, a rope access opening comprising a gap in the sidewall, and a slot extending between the upper and lower surfaces of the grip, said slot having first and second ends and extending substantially radially from said counterbore vertical axis, said slot first end of the slot opening into said gap and defining said rope access opening, and said slot second end opening into said counterbore,
    a rope having a proximal end, a medial body, and a distal end, the proximal end of the rope portion being coupled to the grip proximal to the first end, the medial body extending through the at least one container aperture to couple the handle to the container, the rope being sized to be moveable within the rope access opening, the slot, and the counterbore,
    an enlarged plug secured to the distal end of the rope, the plug defining a bearing surface disposed adjacent the rope, the plug being sized to be received in the counterbore,
    such that during assembly, the plug may be disposed along the upper surface of the grip and the distal end of the rope may be advanced through the gap and the rope access opening and longitudinally through the slot from the rope access opening to the counterbore to position the plug above the counterbore with the rope extending through the second end of the slot, and such that a downward force may then be applied to the plug along the vertical axis of the counterbore to dispose the plug within the counterbore to couple the distal end of the rope to the grip.

13. The battery as claimed in claim 12 wherein the counterbore has a substantially round cross-section, and the plug has a substantially round cross-section.

14. The battery as claimed in claim 12 wherein further comprising a rib extending radially from the plug, the rib being configured to be received in the slot when the plug is disposed in the counterbore.

15. The battery as claimed in claim 12 wherein the second end of the slot is disposed subjacent the counterbore and the retaining surface.

16. The battery as claimed in claim 12 wherein the plug has a top surface, the top surface of the plug being flush with the upper surface of the grip when the plug is disposed within the counterbore.

17. The battery as claimed in claim 12 wherein the handle further comprises a cover cooperatively associated with the upper surface of the grip when the plug is disposed within the counterbore.

18. The battery as claimed in claim 12 wherein the rope has a rest cross-section when no external forces are applied to the rope, and a relatively smaller twist cross-section when the rope is twisted, the slot and rope being relatively sized such that the rope the twist cross-section of the rope may freely pass through the slot, but the rest cross-section of the rope cannot pass through the slot.

19. A method of coupling a rope handle to an electric storage battery comprising the steps of molding a proximal end of a handle rope into a molded polymeric grip to secure the proximal end of the handle rope to the grip to form an integral structure, threading a plug disposed at a distal end of the handle rope through an aperture in a handle bracket projecting outward form a wall of a container of the battery, advancing the distal end of the handle rope through a slot extending radially from a counterbore opening along an upper surface of the grip until the counterbore is disposed subjacent the plug, applying a force to the plug to advance it axially into the counterbore to couple the plug to the grip.

20. The method of claim 19 further comprising the step of threading the plug from a lower surface of the grip through a hole in the grip to the upper surface of the grip.

21. An electric storage battery comprising:

a battery container having a wall and a handle bracket projecting outward from the wall, the bracket defining at least one aperture there through, a handle removably coupled to the bracket, the handle comprising a grip, said grip comprising an upper surface, a lower surface, a first end, and a second end, and defining a retaining recess proximal to the second end, said retaining recess comprising a counterbore having a substantially vertical axis and opening along the upper surface, a retaining surface subjacent the counterbore, a rope access opening, and a slot extending between the upper and lower surfaces of the grip, said slot having first and second ends and extending substantially radially from said counterbore vertical axis, said slot first end opening into said rope access opening and said slot second end opening into said counterbore, a rope having a proximal end, a medial body, and a distal end, the proximal end of the rope portion being coupled to the grip proximal to the first end, the medial body extending through the at least one container aperture to couple the handle to the container, the rope being sized to be moveable within the rope access opening, the slot, and the counterbore, an enlarged plug secured to the distal end of the rope, the plug defining a bearing surface disposed adjacent the rope and a rib extending radially from the plug, the plug being sized to be received in the counterbore, the rib being configured to be received in the slot when the plug is disposed in the counterbore, such that during assembly, the plug may be disposed along the upper surface of the grip and the distal end of the rope may be advanced through the rope access opening and longitudinally through the slot from the rope access opening to the counterbore to position the plug above the counterbore with the rope extending through the second end of the slot, and such that a downward force may then be applied to the plug along the vertical axis of the counterbore to dispose the plug within the counterbore to couple the distal end of the rope to the grip.

22. An electric storage battery comprising:

a battery container having a wall and a handle bracket projecting outward from the wall, the bracket defining at least one aperture there through, a handle removably coupled to the bracket, the handle comprising a grip, said grip comprising an upper surface, a lower surface, a first end, and a second end, and defining a retaining recess proximal to the second end, said retaining recess comprising a counterbore having a substantially vertical axis and opening along the upper surface, a retaining surface subjacent the counterbore, a rope access opening, and a slot extending between the upper and lower surfaces of the grip, said slot having first and second ends and extending substantially radially from said counterbore vertical axis, said slot first end opening into said rope access opening and said slot second end opening into said counterbore, a rope having a proximal end, a medial body, and a distal end, the proximal end of the rope portion being coupled to the grip proximal to the first end, the medial body extending through the at least one container aperture to couple the handle to the container, the rope being sized to be moveable within the rope access opening, the slot, and the counterbore, an enlarged plug secured to the distal end of the rope, the plug defining a bearing surface disposed adjacent the rope, the plug being sized to be received in the counterbore, such that during assembly, the plug may be disposed along the upper surface of the grip and the distal end of the rope may be advanced through the rope access opening and longitudinally through the slot from the rope access opening to the counterbore to position the plug above the counterbore with the rope extending through the second end of the slot, and such that a downward force may then be applied to the plug along the vertical axis of the counterbore to dispose the plug within the counterbore to couple the distal end of the rope to the grip, and a cover cooperatively associated with the upper surface of the grip when the plug is disposed within the counterbore.

23. A method of coupling a rope handle to an electric storage battery comprising the steps of securing a proximal end of a handle rope to a grip, threading a plug disposed at a distal end of the handle rope through an aperture in a handle bracket projecting outward from a wall of a container of the battery, advancing the distal end of the handle rope through a gap in a sidewall of the grip into a slot extending radially from a counterbore opening along an upper surface of the grip until the counterbore is disposed subjacent the plug, and applying a force to the plug to advance it axially into the counterbore to couple the plug to the grip.

24. A method of coupling a rope handle to an electric storage battery comprising the steps of securing a proximal end of a handle rope to a grip, threading a plug disposed at a distal end of the handle rope through an aperture in a handle bracket projecting outward from a wall of a container of the battery, advancing the distal end of the handle rope through a slot extending radially from a counterbore opening along an upper surface of the grip until the counterbore is disposed subjacent the plug, applying a force to the plug to advance it axially into the counterbore to couple the plug to the grip, and coupling a cover to the upper surface of the grip.

* * * * *